UNITED STATES PATENT OFFICE.

JOHN F. JOHNSTON, OF BARBERTON, OHIO, ASSIGNOR TO THE ELECTRIC RUBBER RECLAIMING COMPANY, OF AKRON, OHIO, A CORPORATION OF OHIO.

PROCESS OF TREATING RUBBER WASTE.

1,291,535.     Specification of Letters Patent.     Patented Jan. 14, 1919.

No Drawing.     Application filed April 25, 1918. Serial No. 230,785.

*To all whom it may concern:*

Be it known that I, JOHN F. JOHNSTON, a citizen of the United States, residing at Barberton, in the county of Summit and State of Ohio, have invented certain new and useful Improvements in Processes of Treating Rubber Waste, of which the following is a specification.

This invention is a process of treating rubber waste containing cotton in the form of cloth, cords, threads or the like, to obtain a reclaimed rubber in which the cotton present in the waste is retained and unstranded and is reduced to a fibrous condition and substantially uniformly distributed throughout the reclaimed mass.

Heretofore in rubber reclaiming processes it has been sought to destroy and eliminate the cotton present in the waste rubber. In the present invention it is sought to reclaim the rubber without such destruction and elimination in order to obtain a product containing a substantial and even a large proportion of cotton fiber impregnated with the rubber and substantially uniformly distributed throughout the reclaimed product.

In the practice of my process in its preferred embodiment the rubber waste is more or less finely divided preferably being cut or ground to such a degree of fineness as to permit it to pass through a one-half inch mesh screen. This material is then heated preferably at super-atmospheric pressure in contact with a dilute solution of caustic alkali and desulfurized petroleum to which may be advantageously added a resin, such as rosin. The proportions of the reagents may be widely varied but I prefer to employ in the treatment of each 100 pounds of rubber waste about 75 gallons of a 2 per cent. by weight solution of sodium hydroxid, 15 pounds of kerosene free from sulfur and 5 pounds of resin. In the treatment of the waste rubber the solution is heated to a preferred temperature of about 300° F., for about six or seven hours, the mass being preferably agitated either continuously or intermittently during this treatment. The solution is then drawn off and the reclaimed product washed and dried. It has been found that treatment of waste rubber in accordance with this process produces the changes in the rubber itself which permits of its being again used and that these changes take place without the destruction and elimination of the cotton present in the waste rubber.

From experiments made it appears that the reclaiming solution acts upon the cotton present permitting it to be completely unstranded and tending to produce a light, porous, fluffy fiber from the unstranded cotton and that such cotton fiber takes up and absorbs the rubber more readily and more thoroughly than ordinary cotton and produces in combination with the reclaimed rubber a more uniform, homogeneous and durable product than can be obtained by the addition of ordinary cotton fiber to rubber or rubber compounds.

While I have set forth in detail the preferred practice of my process it is to be understood that the details of procedure and proportions of ingredients may be widely varied and that known chemical equivalents of the reagents employed may be used, without departing from the spirit of my invention or the scope of the subjoined claims.

Having described my invention, I claim:

1. The herein described process of treating waste rubber containing cotton consisting in subjecting it to the action of a dilute solution of alkali containing desulfurized petroleum at an elevated temperature.

2. The herein described process of treating waste rubber containing cotton which consists in subjecting it to the action of a dilute solution of an alkali containing desulfurized petroleum, and a resin at an elevated temperature.

3. The herein described process of treating waste rubber containing cotton which consists in subjecting it to the action of a dilute solution of sodium hydroxid containing kerosene and resin, at an elevated temperature.

4. The herein described process of treating waste rubber containing cotton which consists in subjecting it to the action of a hot mixture of sodium hydroxid containing approximately 2 per cent. weight of sodium hydroxid and containing approximately 15 pounds of kerosene to each 100 pounds of waste rubber to be treated.

5. The herein described process of treating waste rubber containing cotton which consists in subjecting it to the action of a hot mixture of sodium hydroxid containing approximately 2 per cent. by weight of sodium hydroxid and containing approximately 15 pounds of kerosene and 5 pounds of resin to each 100 pounds of waste rubber to be treated.

6. The herein described process which consists in subjecting waste rubber containing cotton to the action of a reclaiming solution comprising sodium hydroxid containing approximately 2 per cent. by weight of sodium hydroxid such solution also containing kerosene and resin in the approximate proportions of 5 pounds of resin and 15 pounds of kerosene to 100 pounds of waste rubber, maintaining the temperature of the reclaiming solution at about 300° F., and agitating the solution and rubber waste.

7. The herein described process which consists in subjecting waste rubber containing cotton to the action of a solution of sodium hydroxid containing approximately 2 per cent. by weight of sodium hydroxid such solution also containing kerosene and resin in the approximate proportions of 5 pounds of resin and 15 pounds of kerosene to 100 pounds of waste rubber for approximately from six to seven hours at a temperature of about 300° F.

In testimony whereof I affix my signature in presence of two witnesses.

JOHN F. JOHNSTON.

Witnesses:
JOHN C. FRANK,
JAMES L. CRAWFORD.